United States Patent [19]

Graffin

[11] Patent Number: 5,148,841
[45] Date of Patent: Sep. 22, 1992

[54] FILLING APPARATUS FOR FILLING RECEPTACLE WITH METERED WEIGHTS

[75] Inventor: André Graffin, La Ferte Bernard, France

[73] Assignee: Serac Group, La Ferte Bernard, France

[21] Appl. No.: 542,696

[22] Filed: Jun. 25, 1990

[30] Foreign Application Priority Data

Jun. 27, 1989 [FR] France ............................ 89 08529
Jan. 25, 1990 [FR] France ............................ 90 00852

[51] Int. Cl.$^5$ ............................................. B65B 3/28
[52] U.S. Cl. ...................................... 141/83; 141/128; 141/196; 141/243; 364/510; 364/567; 177/60; 222/56; 222/59; 222/77; 222/639; B65B/3/28
[58] Field of Search .............. 141/83, 94.1, 128, 192, 141/196, 237, 243, 242, 234, 129, 188, 153; 340/613; 364/510, 567, 570, 579, 571.01, 571.03, 571.04; 222/56, 59, 77, 108, 639-641; 177/50, 52, 56, 57, 60, 63, 64, 66, 80, 103-105

[56] References Cited

U.S. PATENT DOCUMENTS

| | | | |
|---|---|---|---|
| 1,153,307 | 9/1915 | Hunter et al. | 222/108 |
| 2,901,209 | 8/1959 | Bardy et al. | 177/57 |
| 2,925,835 | 2/1960 | Mojonnier | 177/52 |
| 3,484,813 | 12/1969 | Davies | 177/50 |
| 3,985,266 | 10/1976 | Wright, Jr. | 141/83 X |
| 4,023,021 | 5/1977 | Kuschel | 141/83 X |
| 4,206,788 | 6/1980 | Susaki et al. | 141/1 |
| 4,211,263 | 7/1980 | Kennedy et al. | 141/83 |
| 4,217,647 | 8/1980 | Sjoholm et al. | 364/510 |
| 4,450,981 | 5/1984 | Haig | 222/61 |
| 4,467,844 | 8/1984 | Di Gianfilippo et al. | 141/1 |
| 4,513,796 | 4/1985 | Miller et al. | 141/83 |
| 4,581,707 | 4/1986 | Millar | 364/510 X |
| 4,609,058 | 9/1986 | Sashiki et al. | 177/63 X |
| 4,630,654 | 12/1986 | Kennedy, Jr. | 141/83 |
| 4,676,282 | 6/1987 | Bellini et al. | 141/1 |
| 4,696,329 | 9/1987 | Izzi | 141/1 |
| 4,856,563 | 8/1989 | Yamaguchi et al. | 141/1 |
| 4,977,526 | 12/1990 | Jost et al. | 364/567 |

*Primary Examiner*—Henry J. Recla
*Assistant Examiner*—Casey Jacyna
*Attorney, Agent, or Firm*—Griffin Branigan & Butler

[57] ABSTRACT

Filling apparatus for filling receptacles, the apparatus comprising a feed member connected to at least one filling spout via a flow control member connected to an output of a weight processing unit having an input connected to a weighing member in order to deliver opening or closing signals to the flow control member as a function of a weight measured by the weighing member, the apparatus further including a time measuring member associated with the weight processing unit for enabling the processing unit to calculate the flow rate of substance through the flow control member and to compare the calculated flow rate with a flow rate reference value, and to adjust the flow rate of the substance as a function of the result of the comparison.

5 Claims, 2 Drawing Sheets

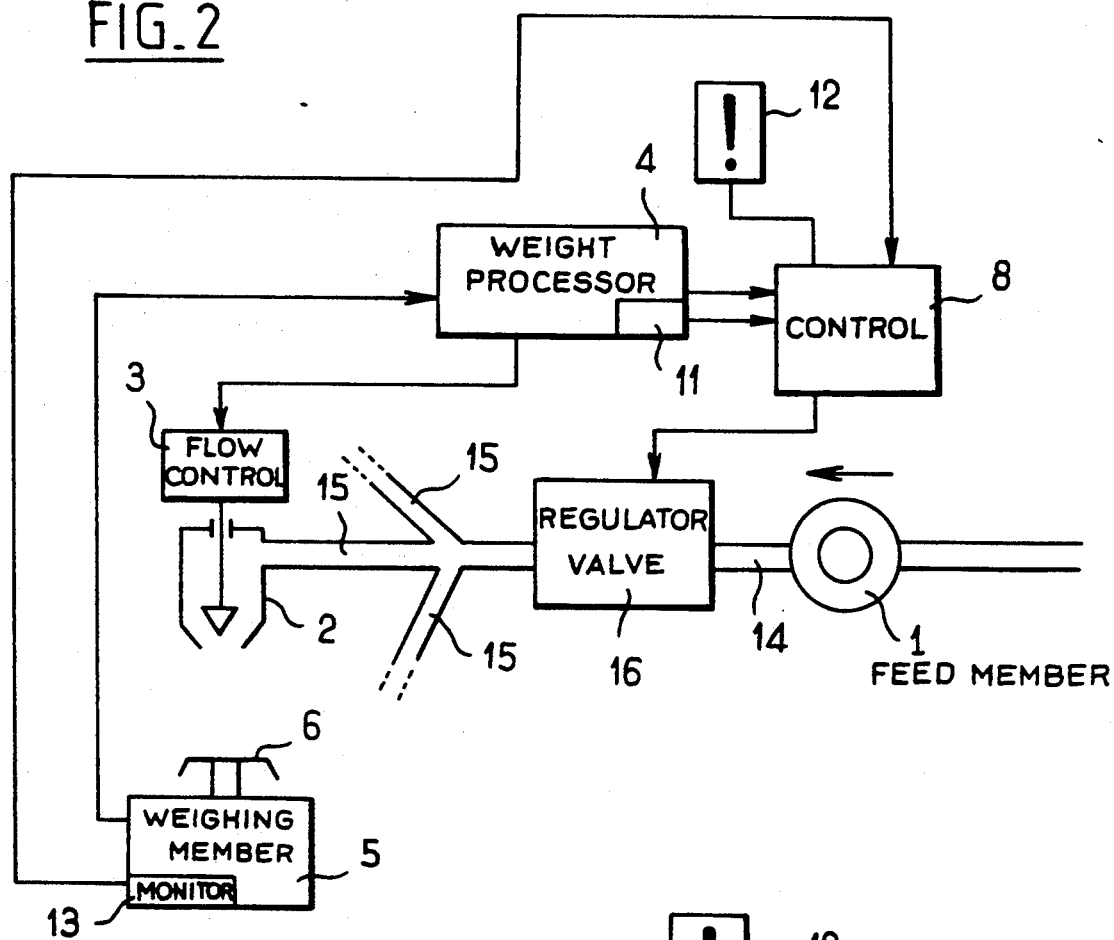
FIG._2
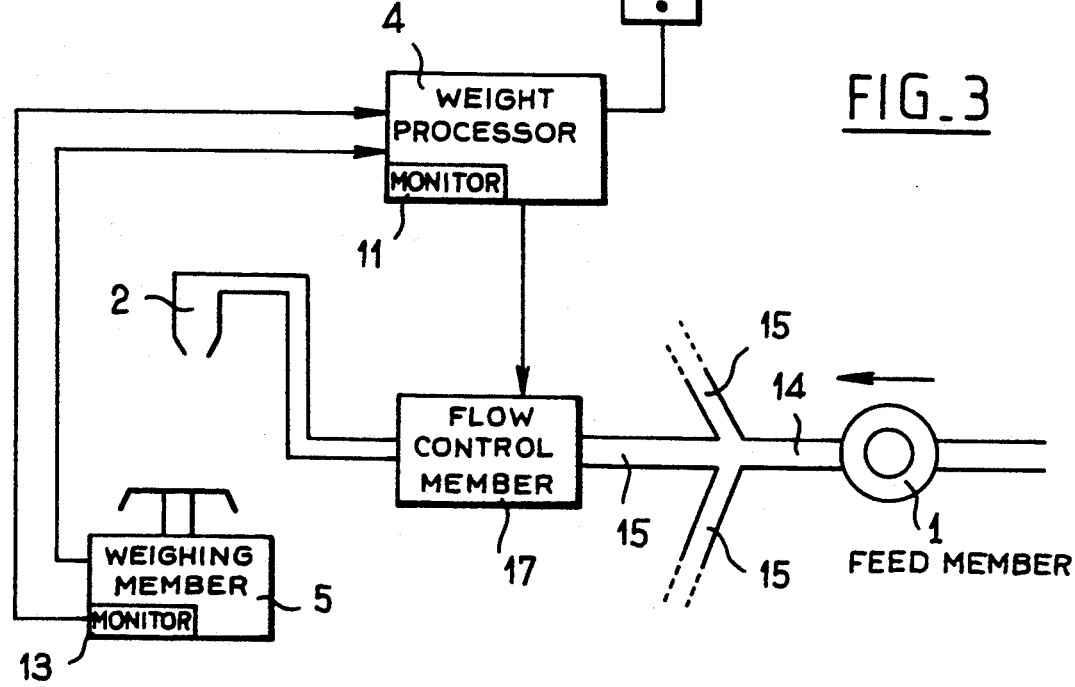
FIG._3

FILLING APPARATUS FOR FILLING RECEPTACLE WITH METERED WEIGHTS

The present invention relates to apparatus for filling receptacles with metered weights.

BACKGROUND OF THE INVENTION

Receptacle filling apparatuses are known in which the substance to be packaged is metered by weighing. In particular, carrousels exist for filling receptacles in which a rotary chassis supports a feed hopper connected to a series of filler spouts via filler valves, each connected to an output of a weighing control unit having an input connected to scales carried by the rotary frame and disposed beneath a receptacle which is itself positioned immediately beneath a filling spout. The scales control opening or closing of a filling valve as a function of a weight measured relative to a reference value input to the scales. Metering by weighing has the advantage of keeping the measurement apparatus separate from the substance to be metered and it is not sensitive to temperature variation, or more generally to variation in the density of the substance.

However, for machines that are to operate at very high throughputs, as is now commonly required for reducing packaging costs, it is observed that under transient conditions, references to weight alone give rise to operating abnormalities related to said transient conditions. These abnormalities include, in particular: problems of foam forming when a receptacle begins to be filled; overflowing at the end of receptacle filling, particularly when an installation is switched on or off due to pressure variations in feed ducts resulting from a varying number of filling spouts being in operation; and disturbances resulting from variations in the viscosity of the substance due to variations in the temperature at which packaging takes place. In this context, it may be observed that when the viscosity of the substance varies a great deal with temperature, operation of the filling apparatus may be severely disturbed by variations in the temperature of the substance to be packaged. In this context, it may be observed that filling spouts are generally designed to operate on an on/off basis, so if the substance to be packaged is at a higher temperature than that for which the filling spouts are adjusted, and is therefore substantially more fluid, the substance to be packaged flows at a rate considerably higher than the design rate and this can result in considerable disturbance to the jet of substance which may lead to splashing or to variation to a greater or lesser extent in the dynamic pressure of the jet of substance on the free surface of substance already contained in the receptacle with considerable variation in the quantity of substance which continues to flow into the receptacle when the filling valve is closed, which variations must be compensated for by complex electronic systems.

An object of the invention is to provide apparatus for filling receptacles with metered weights and which compensates for at least some of the disturbances that result from transient conditions.

SUMMARY OF THE INVENTION

In order to achieve this object, the present invention provides a filling apparatus for filling receptacles, the apparatus comprising a feed member connected to at least one filling spout via a flow control member connected to an output of a weight processing unit having an input connected to a weighing member in order to deliver opening or closing signals to the flow control member as a function of a weight measured by the weighing member, the apparatus including a time measuring member associated with the weight processing unit for enabling the processing unit to calculate the flow rate of substance through the flow control member and to compare said calculated flow rate with a flow rate reference value, and to adjust the flow rate of the substance as a function of the result of the comparison.

Thus, conventional weight measurement for stopping flow when the desired mass has been reached is performed in parallel with flow rate regulation, either by regulating the extent to which a regulation valve is opened, or else by regulating the flow rate at the feed means, thereby minimizing disturbances related to flow without degrading the measurement of the mass inserted into the receptacle, and indeed, in general, improving said measurement.

In an advantageous version of the invention, the flow control member includes a control element associated with each filling spout and a regulator element common to a plurality of filling spouts. Such a disposition serves in particular to ensure that each filling spout is provided with a substantially constant feed regardless of the number of filling spouts that are in operation, particularly while the installation is being started up or shut down.

In a particular aspect of this version of the invention, the control element associated with each filling spout includes an opening of variable section, the weight processing unit associated with each filling spouts performs an individual comparison for each filling spout with a flow rate reference value, and the apparatus includes a common control member for summing the calculated flow rates of a plurality of filling spouts and acting on the common regulator element. Thus, not only is each spout fed under substantially constant conditions, but the flow rate through each spout is "personalized" as a function of its own characteristics.

In another advantageous aspect of the invention, the flow rate reference value of each filling spout is variable as a function of the degree to which the corresponding receptacle is filled. The flow rate is thus adapted to circumstances, e.g. a low flow rate at the beginning of filling in order to avoid foaming, a high flow rate during an intermediate stage in order to fill the central portion of the receptacle quickly, and a lower flow rate at the end of filling in order to increase the accuracy of the metered weighing.

In yet another advantageous aspect of the invention, the time measuring member measures an actual filling time during which the flow control member is open, and the apparatus includes means for comparing the actual filling time with a reference time, and means for acting as a function of the difference between the actual filling time and the reference time to maintain the flow rate of the substance through the flow control member substantially constant. This minimizes the effects of variations in the viscosity of the substance to be packaged.

BRIEF DESCRIPTION OF THE DRAWINGS

Embodiments of the invention are described by way of example with reference to the accompanying drawings, in which:

FIG. 2 is a fragmentary diagrammatic view of a second embodiment of the invention; and FIG. 3 is a fragmentary diagrammatic view of a third embodiment of the invention.

DETAILED DESCRIPTION

Figure 1:
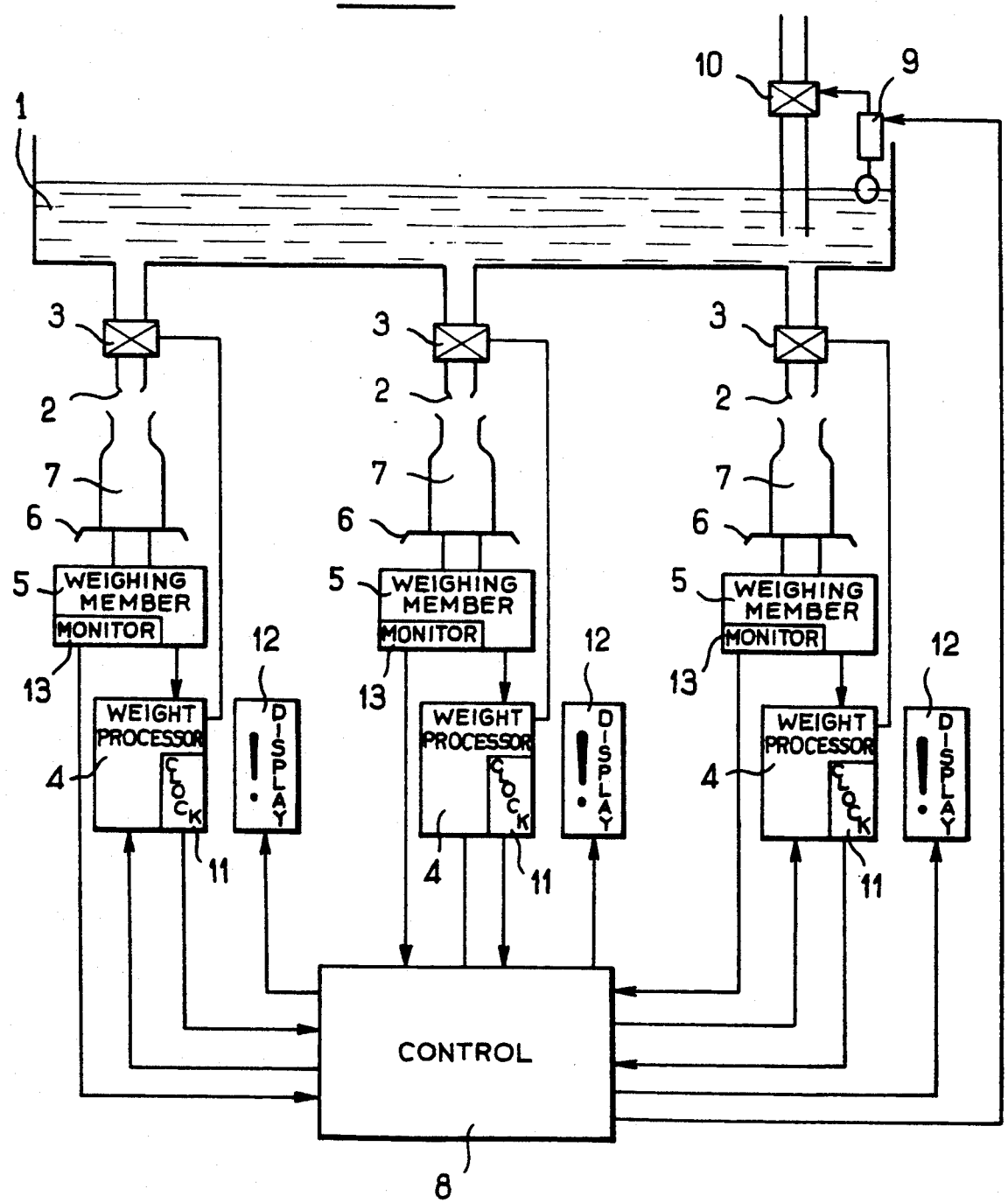
FIG. 1 is a fragmentary diagrammatic view of a first embodiment of the invention.

With reference to FIG. 1, the apparatus shown for filling receptacles includes a feed hopper 1 connected to three filling spouts 2 via three flow control members constituted by valves 3 operating in on/off mode and each connected to one output of a corresponding weight processing unit 4 having an input connected to a weighing member 5 (such as a balance) disposed beneath a filling spout 2 and including a tray 6 on which a receptacle 7 is disposed. The weight processing unit 4 is designed in conventional manner to open and close the filling valve 3 as a function of a weight measured by the weighing member 5 and of a reference value either as input into the weight processing unit when installed or else as applied to the weight processing unit by a common control unit 8 to which it is connected.

The flow rate passing through a filling valve 3 when opened is adjusted by the depth of substance in the feed hopper 1 as detected by a level sensor 9 acting on a feed valve 10.

In existing systems, the level sensor 9 receives a constant reference value such that the pressure at the filling spouts 2 is constant regardless of the temperature of the substance in the feed hopper 1. However, the filling apparatus may be used under an extremely variable range of temperature conditions. In particular, an installation for packaging oil is commonly used under temperature conditions in the range about 15° C. to about 30° C. Under such conditions, the viscosity of the oil also varies very considerably, passing from a substance which is very thick to a liquid which is nearly as fluid as water. When the depth of liquid in the feed hopper is adjusted to a constant level, the flow rate through the feed spouts 2 varies enormously with viscosity.

As recalled in the introduction to the present description, in order to avoid variation in flow rate and the drawbacks to which it gives rise, provision is advantageously made, in accordance with the invention, to fit each weight processing unit 4 with a clock 11 which measures the actual filling time during which the associated filling valve is open, which information is transmitted to the control unit 8. In this embodiment, the control unit 8 takes a mean of the actual filling times of the various filling lines and it compares this mean with a reference time input to the control unit when it was installed or when it was switched on, as a function of the substance in question to be packaged. When the actual mean filling time does not coincide with the reference time, then the control unit 8 applies a signal to the level sensor 9 to alter its reference level, thereby adapting the depth of substance in the feed hopper 1 so as to maintain the flow rate of substance through the filling valves at a substantially constant value.

For example, in an installation for packaging oil, when ambient temperature rises, the oil becomes more fluid and the time taken to fill a receptacle tends to shorten. The depth of liquid in the feed hopper 1 is then reduced in order to restore the initial flow rate through the filling spouts.

The actual filling time measurement which is performed, in accordance with the invention, in parallel with the weight measurement performed by the weight processing unit, may also be used to inform the operator in charge of the installation in the event of an operating anomaly at one of the filling spouts. In particular, when a filling spout tends to clog up, the actual filling time associated with this filling spout becomes abnormally high compared with the reference time. In accordance with the invention, provision may be made to input a critical filling time into the control unit 8, which critical filling time should normally never be reached by an actual filling time, with the critical filling time being input to the control unit when switched on or being calculated from the mean of the actual filling times. Each time an actual time is transmitted by a clock 11 of a weight processing unit 4, this time is compared with the critical filling time, and if the critical filling time is reached, then the control unit 8 trips an alarm which is displayed either on a central console, or else on a display device 12 disposed beside the filling spout in question. Depending on the degree of urgency of the alarm signal, the operator is informed that the filling spout in question needs attention next time the machine is stopped, or else that this filling spout must be taken out of service immediately.

When the weighing members 5 include self-monitoring means 13 for detecting a faulty weighing member, provision is advantageously made in accordance with the invention for connecting the self-monitoring means 13 to the control unit 8 such that when a faulty weighing member 5 is observed, the corresponding weight processing unit 4 is short-circuited and replaced by time delay control as a function of the mean actual filling times corresponding to the other filling spouts. In order to ensure that time control of a filling spout is particularly adapted to that spout, it is preferable to provide for the control unit 8 to store the actual filling times of each filling spout and to perform timed control of a filling spout whose weighing member is faulty as a function of the mean actual filling times and of at least one actual filling time corresponding to the filling spout in question prior to switching over to timed control. For example, if it is observed that the filling spout whose weighing member has become faulty normally had an actual filling time that was longer (larger) than the average, then timed filling is performed at the same ratio relative to the continuously updated mean actual filling times.

FIG. 2 is a fragmentary diagram of another embodiment of the invention which is more particularly intended to regulate the flow rate through the filling spouts during the start up and shut down stages of the installation. In the embodiment shown, the feed member 1 is this time constituted by a centrifugal pump disposed on a length of feed ducting 14 common to a plurality of filling spouts. Between the feed pump 1 and the filling spouts 2 (of which only one is shown in order to simplify the drawing), the common feed duct 14 is subdivided into a plurality of individual feed ducts 15. In the same manner as before, the filling apparatus includes a weighing member 5 associated with each filling spout 2, said weighing member being connected to a weight processing unit 4 including a time measuring member 11. It will readily be understood that when the machine is started up, i.e. when the filling spouts are selectively put into operation after the first receptacles have been installed on the installation, the feed pressure exerted by the feed pump 1 in the individual ducts is higher when only one or when only a small number of filling spouts is in operation than it is when all of the filling spouts are in operation. In general, the filling spouts are adjusted for a dynamic feed pressure which corresponds to all of the filling spouts being in operation. While the installation is being started up, the higher dynamic pressure in the feed ducts 15 of the first filling spouts to be put into operation therefore gives rise to disturbances, such as the formation of foam or splashes. In accordance with the invention, it is thus advantageous to provide, in addition to the controlled element constituted by the filling valve 3 operating in on/off mode, a regulator element constituted by a regulator valve 16 disposed on the feed duct 14 common to a plurality of filling spouts.

In its application to maintaining a constant flow rate during normal operation, the time measuring member 11 is used as before for measuring the actual filling time, and a common control unit 8 operates as before to compare the actual times with a reference time and to apply a signal, where appropriate, to the regulator valve 16 for the purpose of opening it a little or closing it a little.

In its application to starting up the machine, the time measuring member 11 together with the signals delivered by the weighing member 5 serves to calculate the instantaneous flow rate of the filling spouts in operation. The common control unit 8 then compares the measured instantaneous flow rates, or the mean of these instantaneous flow rates, with an instantaneous flow rate reference value which acts on the regulator valve 16 as a function of the comparison. When the machine is started up, the valve 16 is adjusted to a minimum aperture suitable for ensuring a flow rate which is sufficient for operating the first filling spout that is to be put into operation. Once a second filling spout is put into operation, the flow rate at each of the filling spouts that are in operation will tend to be lower. This drop in instantaneous flow rate is detected by the common control unit 8 which sends a signal for increasing the aperture of the regulator valve 16. Each time a new filling spout is brought into service, the flow rate through the common duct 14 is thus adapted to the sum of the flow rates required in the individual ducts 15.

Similarly, when the machine is shut down, the filling spouts are progressively switched off one after another and the common control unit 8 then serves to close down the regulator valve 16 progressively so as to ensure a constant flow rate through each filling spout.

It may be observed that measurement of the instantaneous flow rate may be used to act on the regulator valve 16 not only while starting up or closing down the machine, but also during normal operation of the machine in order to ensure that the flow rate along the main duct 14 is regulated in spite of disturbances that may occur, e.g. variations in the viscosity of the substance being packaged. However, if the instantaneous flow rate is used alone without calculating the actual time taken to fill the receptacles, then it is not longer possible to switch over to timed control in the event of a weighing member 5 being faulty. The apparatus of the invention is thus preferably designed to calculate simultaneously the instantaneous flow rate and the actual receptacle filling times.

FIG. 3 shows a third embodiment in which the filling apparatus includes, as in FIG. 2, a centrifugal pump 1 feeding a common duct 14. Immediately downstream from the centrifugal pump 1, the common duct 14 is subdivided into individual ducts 15. Each individual duct 15 has its own variable aperture flow control member 17 disposed thereon for feeding a filling spout 2, and in this embodiment the filling spouts do not include their own on/off valves. The apparatus also includes a weight processing unit 4 including a time measuring member 11 and receiving inputs from a weighing member 5 and its self-monitoring means 13, and providing outputs to the flow control member 17 and to an alarm 12.

This apparatus operates either at constant flow rate while measuring effective filling times as in the FIG. 1 apparatus, or else by using the time measuring member 11 to calculate an instantaneous flow rate and, where necessary to vary the flow rate reference value as a function of parameters chosen in advance. For example, it has been observed that it is often desirable to begin filling a receptacle at a very low rate in order to avoid forming a foam when the substance hits the bottom of the receptacle and until a sufficient quantity of substance has been inserted to form a moving layer on the bottom of the receptacle. A first flow rate reference value is thus input into the memory of the weight processing unit 4 prior to starting up the machine. The quantity of substance to be inserted in order to form the moving layer corresponds to a weight of the substance to be packaged, which once detected by the weighing member 5, triggers a change in the flow rate reference value to a second reference value which is higher than the first reference value, and which is also stored in memory, thereby enabling the major portion of the receptacle to be filled quickly until the mass of substance inserted in the receptacle reaches a second threshold, e.g. 10% below the total mass of substance to be inserted. When this second threshold is reached, the weighing member 5 triggers a new change in flow rate reference value to a lower reference value enabling filling to be terminated at a low flow rate, thereby obtaining good accuracy when filling is finally stopped. In this embodiment, it may be observed that each filling stage may occupy a length of time which may be stored and used as a basis for timed filling in the event of the self-monitoring means 13 detecting a failure of the weighing member. In this embodiment, it may also be observed that the filling spout 2 is preferably at a sufficient distance from the flow control member 17 to enable the flow in the portion of the duct downstream from the flow control member 17 to stabilize. In order to prevent the portion of the duct lying between the flow control member 17 and the filling spout 2 emptying, or even to prevent drops forming on the filling spout when the flow rate control member 17 is fully closed, the bottom opening of the filling spout is preferably at a higher level than the flow control member 17.

Naturally, the invention is not limited to the embodiments described and numerous variants may be applied without going beyond the scope of the invention. In particular, the use of a variable aperture flow control member 17 may be combined with a regulator valve disposed on the common duct 14 upstream from the subdivision of the feed duct into individual ducts.

The apparatus of the invention is particularly useful in the common case of feed from a tank whose depth varies considerably during packaging, thereby causing the feed pressure to vary correspondingly.

When using a regulator valve 16 or 17, and more particularly when the feed member is a tank containing a variable depth, it may be advantageous to provide for the initial aperture through the regulator valve to be adjusted as a function of the static pressure measured upstream from said valve and applied to the weight processing unit 4 or to the control member 8 or the equivalent thereof in the machine under consideration.

I claim:

1. A filling apparatus for filling receptacles, the apparatus comprising a feed member connected to at least one filling spout via a flow control member connected to an output of a weight processing unit having an input connected to a weighing member in order to deliver opening or closing signals to the flow control member as a function of a weight measured by the weighing member, a time measuring member for measuring an actual filling time during which the flow control member is open at a selected aperture, means for comparing the actual filling time with a reference time, and means for modifying the aperture of the flow control member as a function of the difference between the actual filling time and the reference time.

2. Filling apparatus according to claim 1, including comparator means for comparing the actual filling time and a critical filling time, and means for triggering an alarm when the actual filling time reaches the critical filling time.

3. Filling apparatus according to claim 1, including a plurality of filling spouts, and a common control member for taking the average of the actual filling times corresponding to each of the filling spouts and for controlling aperture of the flow control members as a function of the difference between the mean of the actual filling times and the reference time.

4. Filling apparatus according to claim 3, in which the weighing members include self-monitoring means for detecting a faulty weighing member, and wherein the control member is connected to the self-monitoring means in order to control the flow control member associated with a faulty weighing member by timed control short circuiting the corresponding weight processing unit, timed control being performed as a function of the mean of the actual filling times corresponding to the other filling spouts.

5. Filling apparatus according to claim 4, wherein the control member includes means for storing the actual filling times corresponding to each filling spout, and wherein the timed control of a filling spout is performed as a function of the mean of the actual filling times and of at least one actual filling time corresponding to said filling spout prior to switching over to timed control.

* * * * *